US007877878B2

(12) United States Patent
Grossman et al.

(10) Patent No.: US 7,877,878 B2
(45) Date of Patent: Feb. 1, 2011

(54) METHOD OF CONSTRUCTION FOR A GRAIN BIN FLOOR SUPPORT

(75) Inventors: Rodney B. Grossman, Goshen, IN (US); Mark S. Dingeldein, Milford, IN (US)

(73) Assignee: CTB, Inc., Milford, IN (US)

( * ) Notice: Subject to any disclaimer, the term of this patent is extended or adjusted under 35 U.S.C. 154(b) by 0 days.

(21) Appl. No.: 12/348,116

(22) Filed: Jan. 2, 2009

(65) Prior Publication Data

US 2009/0113842 A1 May 7, 2009

Related U.S. Application Data

(62) Division of application No. 11/068,471, filed on Feb. 28, 2005, now Pat. No. 7,487,621.

(60) Provisional application No. 60/623,504, filed on Oct. 29, 2004.

(51) Int. Cl.
*B21D 47/00* (2006.01)
*B23P 17/00* (2006.01)

(52) U.S. Cl. ................ 29/897.32; 29/897.3; 29/897.31; 29/897.312; 52/302.2; 52/664; 52/690; 72/177

(58) Field of Classification Search ................ 29/897.3, 29/897.31, 897.312, 897.32; 52/302.2, 192, 52/664, 690; 72/177
See application file for complete search history.

(56) References Cited

U.S. PATENT DOCUMENTS

| | | | |
|---|---|---|---|
| 1,420,775 | A | 6/1922 | Stanwood |
| 1,636,891 | A | 7/1927 | Barrows |
| 2,047,334 | A | 7/1936 | Shodron |
| 2,614,034 | A | 10/1952 | Brummerstedt |
| 2,818,009 | A | 12/1957 | Steffen |
| 3,283,459 | A | 11/1966 | Beranek |
| 3,408,747 | A | 11/1968 | Steffen |
| 3,426,445 | A | 2/1969 | Steffen |
| 3,512,322 | A | 5/1970 | Steffen |
| 3,568,388 | A | 3/1971 | Flachbarth et al. |
| 3,591,994 | A | 7/1971 | Steffen |
| 3,741,107 | A | 6/1973 | Boyd et al. |
| 3,792,560 | A | 2/1974 | Naylor |
| 3,875,714 | A | 4/1975 | Nayler et al. |
| 3,979,871 | A | 9/1976 | Pollock |
| 4,073,110 | A | 2/1978 | Kennedy |
| 4,137,682 | A | 2/1979 | Trumper |
| 4,281,489 | A | 8/1981 | Kallestad et al. |

(Continued)

OTHER PUBLICATIONS

European Search Report dated Mar. 31, 2009.
European Examination Report dated Jul. 1, 2009.

*Primary Examiner*—Rick K Chang
(74) *Attorney, Agent, or Firm*—Harness, Dickey

(57) ABSTRACT

A method of constructing a grain bin floor support system having a plurality of interconnected support members. The support members are constructed from a monolithic sheet of structural metal stamped and formed having upper and lower horizontal rails spanning across and integrally connected by a plurality of transverse support columns. The rails include a longitudinally extending center segment and a stabilizing portion adjacent each end thereof. The stabilizing portions are configured to be folded out in opposite directions forming a non-planar self-supporting structure.

8 Claims, 16 Drawing Sheets

U.S. PATENT DOCUMENTS

| | | | | |
|---|---|---|---|---|
| 4,282,694 | A | | 8/1981 | Mead |
| RE31,368 | E | | 9/1983 | Trumper |
| 4,409,771 | A | | 10/1983 | Lowe |
| 4,418,558 | A | * | 12/1983 | Simmons .................... 72/177 |
| 4,468,910 | A | | 9/1984 | Morrison |
| 4,557,086 | A | | 12/1985 | Liefer et al. |
| 4,562,678 | A | | 1/1986 | Carroll et al. |
| 4,604,842 | A | | 8/1986 | Sukup |
| 4,619,085 | A | | 10/1986 | Liefer et al. |
| 4,841,701 | A | | 6/1989 | Sukup |
| RE33,358 | E | | 10/1990 | Sukup |
| 5,107,644 | A | | 4/1992 | Hanig et al. |
| 5,287,671 | A | | 2/1994 | Ueki |
| 5,600,928 | A | | 2/1997 | Hess et al. |
| 5,619,837 | A | | 4/1997 | DiSanto |
| 5,765,329 | A | | 6/1998 | Huang |
| 5,833,386 | A | | 11/1998 | Rosan et al. |
| 5,873,612 | A | | 2/1999 | Connor |
| 6,076,311 | A | | 6/2000 | Godfrey |
| 6,408,586 | B1 | | 6/2002 | Deckert |
| 6,748,705 | B2 | | 6/2004 | Orszulak et al. |
| 7,310,919 | B2 | * | 12/2007 | Grossman et al. .......... 52/302.2 |
| 7,487,621 | B2 | | 2/2009 | Grossman et al. |
| 2002/0117602 | A1 | | 8/2002 | Ward et al. |

* cited by examiner

METHOD OF CONSTRUCTION FOR A GRAIN BIN FLOOR SUPPORT

CROSS-REFERENCE TO RELATED APPLICATIONS

This application claims the benefit of U.S. application Ser. No. 11/068,471, filed on Feb. 28, 2005 and U.S. Provisional Application Ser. No. 60/623,504, filed on Oct. 29, 2004, the disclosures of which are incorporated herein by reference.

FIELD OF THE INVENTION

The present invention relates to a grain bin floor system, and in particular, a monolithic support member having integrated channels and rails.

BACKGROUND OF THE INVENTION

Grain storage bins are typically used to store and house wheat, corn, or various other grain type products. Various floor support structures are used to keep the grain products from contacting a bin floor. For example, grain storage bins often include a false floor that is supported above a base of the storage bin. The elevated false floor creates a plenum between the false floor and the base of the storage bin. The false floor includes a series of perforations that permit heated or ambient air located within the plenum to pass through the false floor and into contact with grain supported by the false floor. Circulation of the air through the grain serves many functions, such as drying or otherwise conditioning the grain to prevent the grain from spoiling, thus allowing long term storage.

Conventionally, the false floor is comprised of a series of longitudinal panels cut to desired lengths and placed side-by-side on a plurality of floor support members, or stanchions, to substantially cover the entire floor area of the grain storage bin. A variety of floor support designs have been developed for supporting false floors on the bases of bins. Many individual supports are necessary in a single bin due to the high loading stresses provided by a bin full of grain or the like. It is highly desirable to provide bin floor assemblies which are flexible in design and easy to assemble and install while providing adequate support for the floor. Moreover, it is desirable to provide components and assemblies that can be fabricated economically using a minimum amount of material and easily stacked for compactness during transportation and storage.

While conventional grain bin floor support members are suitable for their intended use, they are subject to improvement. For example, there is a need for an enhanced floor support member that requires little assembly, a strengthened and more durable floor support surface, and/or an overall design that permits the stacking of multiple floor support members in a compact, space saving manner during shipment.

SUMMARY OF THE INVENTION

The present invention is directed to a grain bin floor support system having a plurality of interconnected support members. In one embodiment, the support members are constructed from a monolithic sheet of structural metal stamped and formed having upper and lower horizontal rails spanning across and integrally connected by a plurality of transverse support columns. The rails include a longitudinally extending center segment and a stabilizing portion adjacent each end thereof. The stabilizing portions are configured to be folded out in opposite directions forming a substantially non-planar self-supporting structure.

In another embodiment, the grain bin floor support system provides a first plurality of support members interconnected with one another and arranged defining a substantially circular shaped outer perimeter. A second plurality of support members is arranged forming a series of interior rows extending from a first portion of the perimeter to a second portion. The support members are formed from a monolithic sheet of structural material having upper and lower spaced-apart rails connected by a plurality of integrally formed transverse columns.

In another aspect, the present invention provides a grain bin floor system having a plurality of interconnected support members providing a support surface above a bin foundation. The support members are each formed from a monolithic blank of structural metal having a substantially horizontal rail adapted to support a bin floor; the rail having first and second opposing end portions, and supported by a plurality of transverse columns. At least one of the end portions is configured to be positioned from an in-plane to an out-of-plane arrangement relative to the blank, thus providing free standing support. In various embodiments, the support members have a second substantially horizontal rail opposite the first rail. The second rail is supported by the bin foundation. The transverse columns are disposed between the first and second rails and are integral therewith.

The present invention also provides a method of constructing a grain bin floor system. The method includes providing a monolithic, flat sheet of structural steel and stamping a pattern of channels and apertures therein to form a blank. The blank is shaped and formed into a support member having upper and lower spaced-apart rails spanning across and integrally connected by a plurality of transverse support columns. The support members are then arranged on a grain bin foundation and adjacent support members are interconnected using a tab and slot system. A plurality of floor planks are secured to the upper rails of the support members.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

Figure 1:
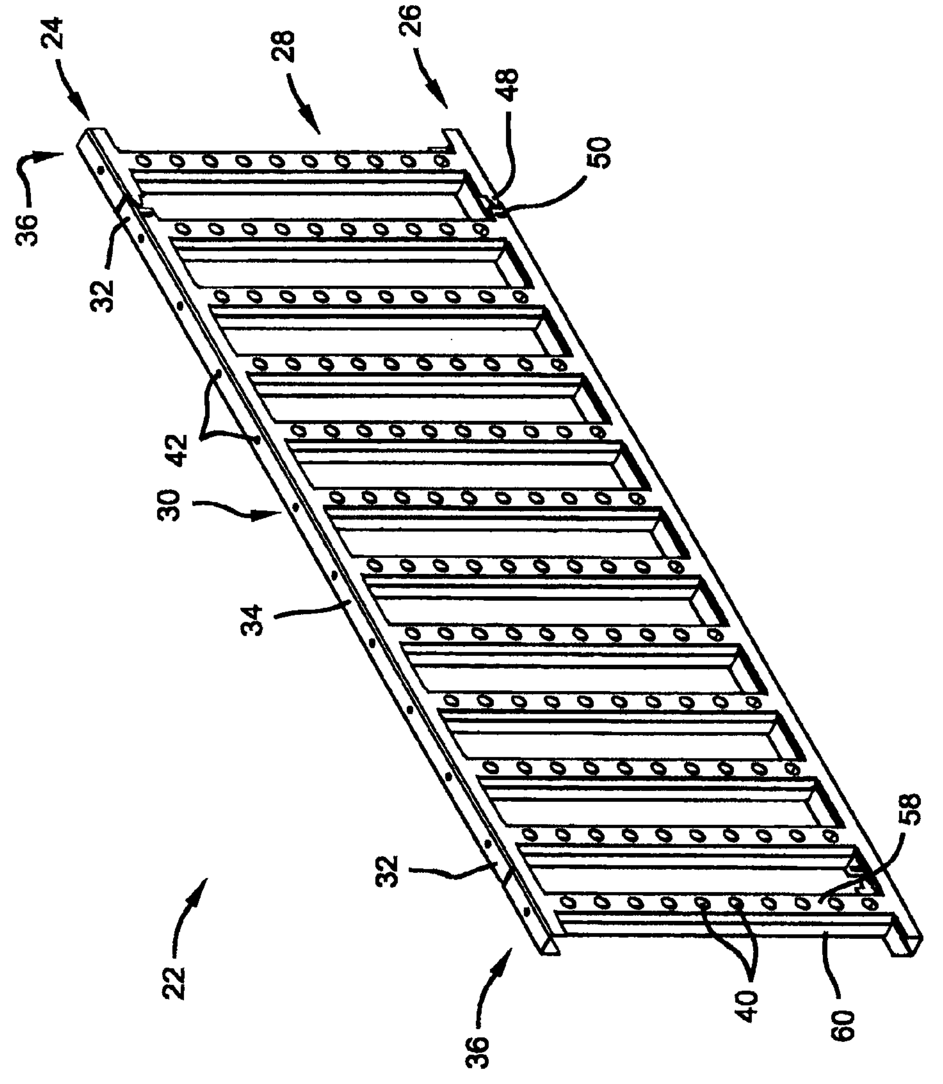
FIG. 1 is a perspective view of one embodiment of a grain support member according to the principles of the present invention.

The present invention is directed to a grain bin floor support system having a plurality of interconnected support members 22. FIG. 1 illustrates a perspective view of one embodiment of a grain bin floor support member 22. As shown, the support member 22 consists of upper and lower spaced-apart channels, or rails 24, 26, spanning across and integrally connected by a series of transverse channels, or columns 28, constructed entirely from a monolithic structural steel blank 38. In presently preferred embodiments, the upper and lower rails 24, 26 are substantially horizontal and parallel to one another, and the columns 28 vertically extend from the upper rail 24 to the lower rail 26. The one piece construction of the present invention eliminates the labor intensive processes of welding individual columns to a set of rails, or using other similar welded designs.

Figure 2:
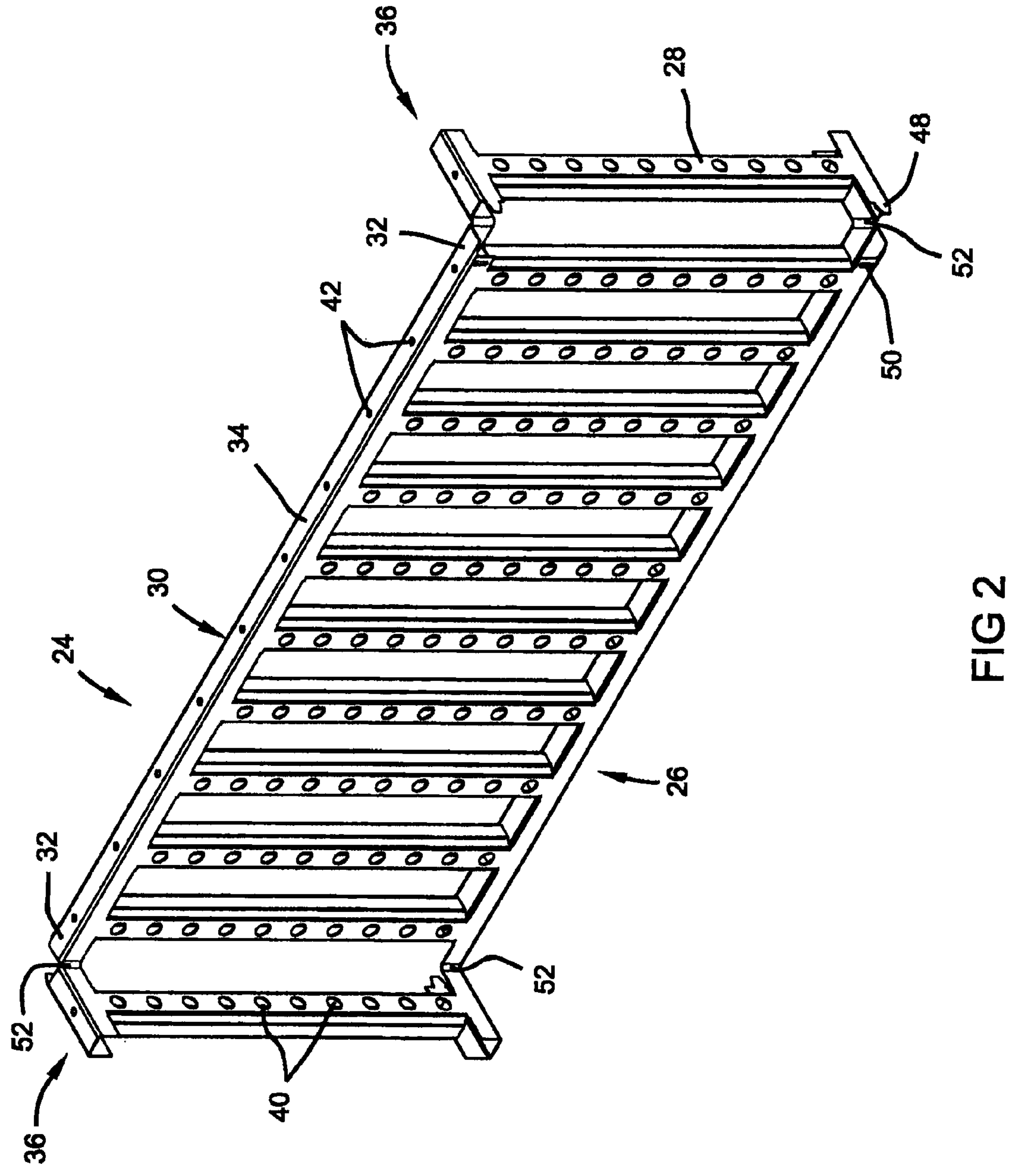
FIG. 2 is a perspective view of a grain support member having its stabilizing legs extended in an outward position.

In various embodiments, the rails 24, 26 include a longitudinally extending center segment 30 having first and second opposite ends 32. At least a portion of the upper rail 24 is configured having a substantially planar supporting surface 34 configured to support one or more grain bin floor planks. At least a portion of the lower rail 26 is supported by a foundation of the grain bin. Stabilizing portions, or legs 36, are built into the support member 22 adjacent each respective end 32 of the center segment 30. The stabilizing legs 36 are configured to be outwardly folded by an installation professional into a self supporting structure. By folding the stabilizing legs in opposite outward directions as shown in FIG. 2, a substantially Z-shaped support member is formed, maximizing the stability achieved for a single free-standing floor support member.

Figure 3:
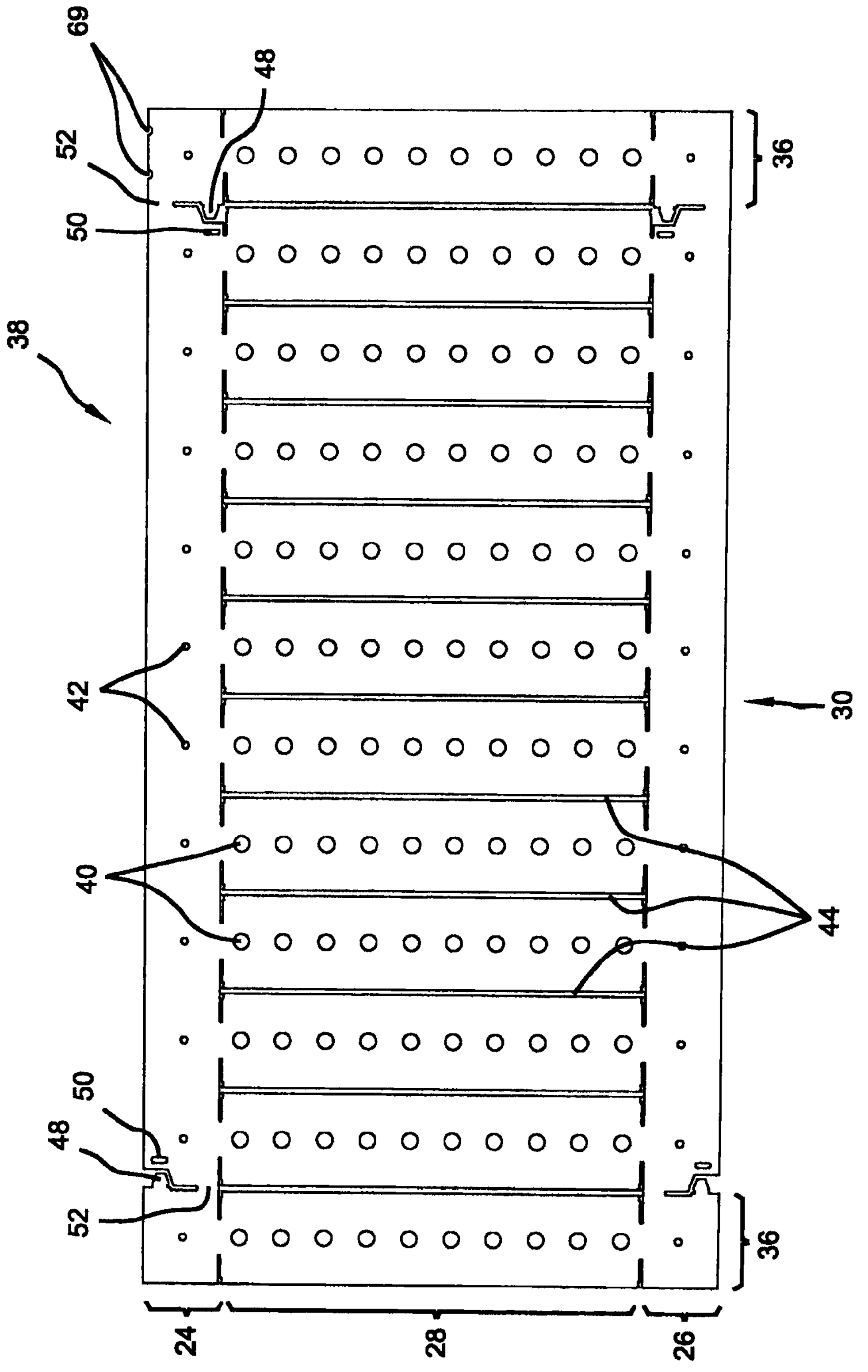
FIG. 3 is a plan view of a flat, planar structural steel blank punched with channels and apertures prior to being shaped and formed into the support member of the present invention.

It should be understood that while it is presently preferred to use a plurality of support members 22 having a stabilizing leg 36 at each end of the support member 22, the present invention also contemplates the use of support members 22 having only one extending stabilizing leg 36. In that case, the stabilizing leg 36 is folded out from an in-plane to an out-of-plane arrangement relative to the center segment 30, forming a substantially L-shaped support member 22. It may also be desirable to use a combination of Z-shaped and L-shaped support members 22. Preferably, the various support members 22 are configured to interconnect with one another as will be described in detail below. It should further be noted that while the support members 22 are described herein as having an upper rail 24 and a lower rail 26 in order to define a spatial relationship, as can be seen in FIGS. 1-3, the support member 22 is designed without having a predetermined orientation, such that either rail 24, 26 can be used interchangeably in the upper or lower positions. Although it is presently preferred to have both upper and lower rails, it is also contemplated that the support member can be formed having only one rail disposed at either the upper or lower location.

FIG. 3 depicts a planar, monolithic structural steel blank 38 stamped and punched with a plurality of column apertures 40, rail apertures 42, and channels 44 allowing for the subsequent bending, shaping and formation of the integral rails 24, 26 and columns 28 of the support member 22. In certain embodiments, the blank 38 is scored with bend lines 46, partially depicted in FIGS. 4 and 5, for accurate and uniform shaping of the rails 24, 26 and columns 28. Preferably, the support member 22 is formed from 18 gauge galvanized sheet metal for an increased life expectancy as compared to the prior art welded black steel.

Figure 4:
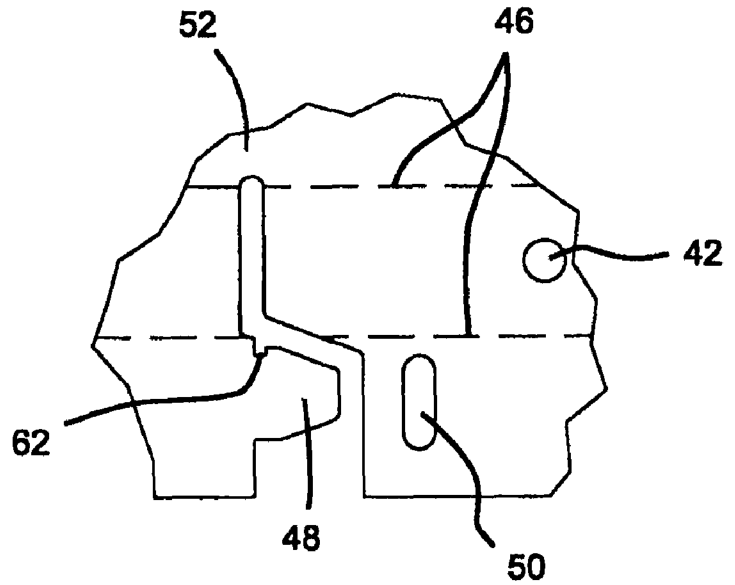
FIGS. 4 and 5 are detailed views of a set of tabs and slots disposed in the upper and lower rails near each end of the support member.
Figure 5:
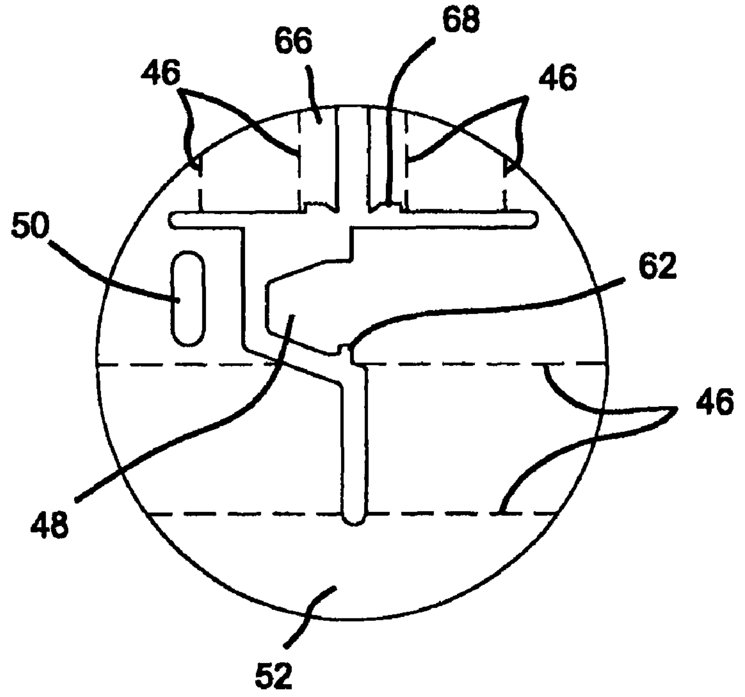

In various embodiments, each support member 22 has at least one interlocking mechanism configured to interconnect, or secure adjacent support members 22 to one another. FIGS. 4 and 5 are magnified portions of FIG. 3 and illustrate the stamping of an integral tab and slot type interlocking mechanism. As depicted in one embodiment, the blank 38 is stamped so as to define an integral tab member 48 in each rail 24, 26 as part of the stabilizing legs 36. A corresponding opening, or slot 50 is stamped in the upper and lower rails 24, 26 near each respective end 32 of the center segment 30 of the support member 22.

Figure 6:
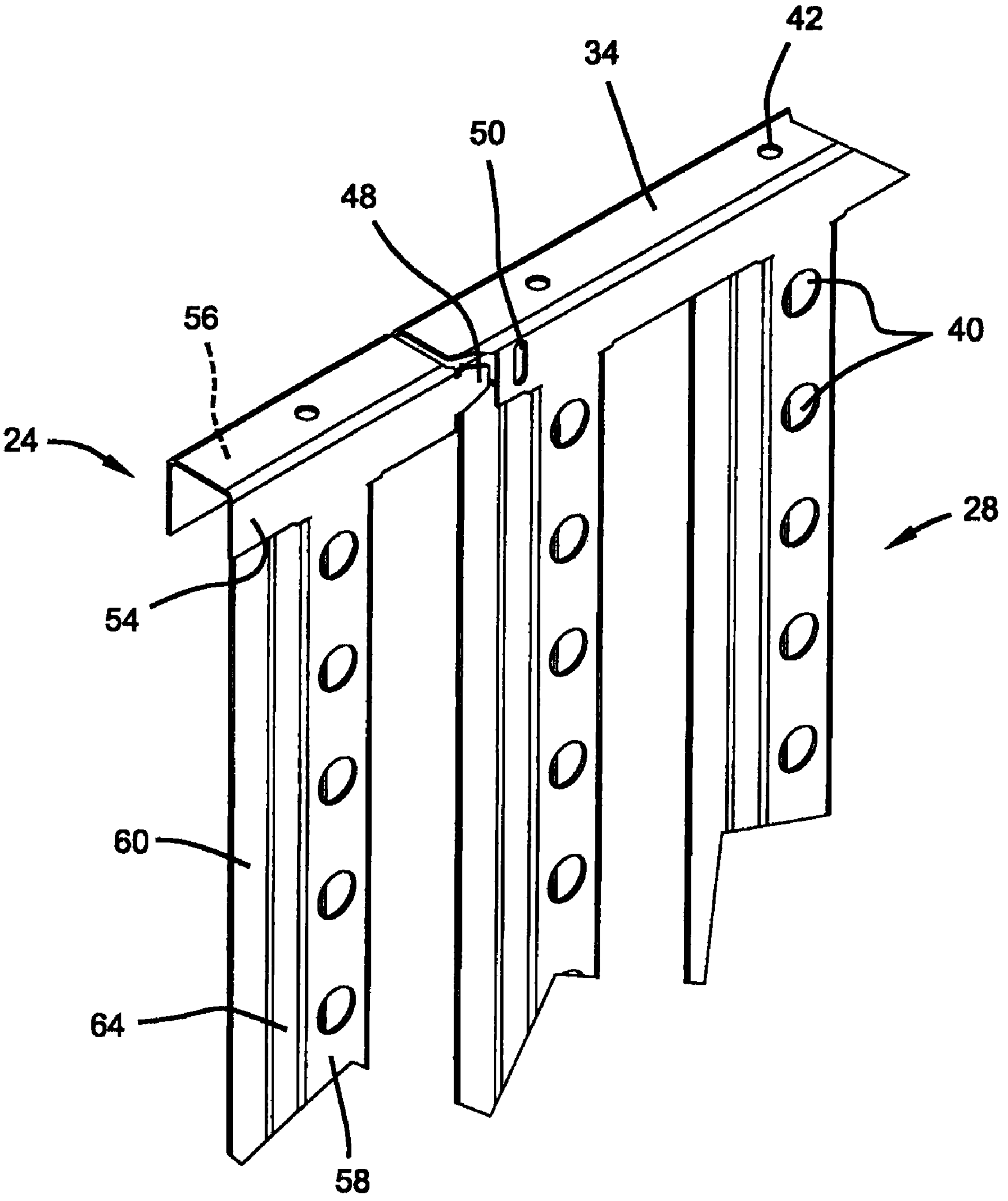
FIG. 6 is a perspective view illustrating the tab and slot features of a stabilizing portion of the support member prior to folding.
Figure 7:
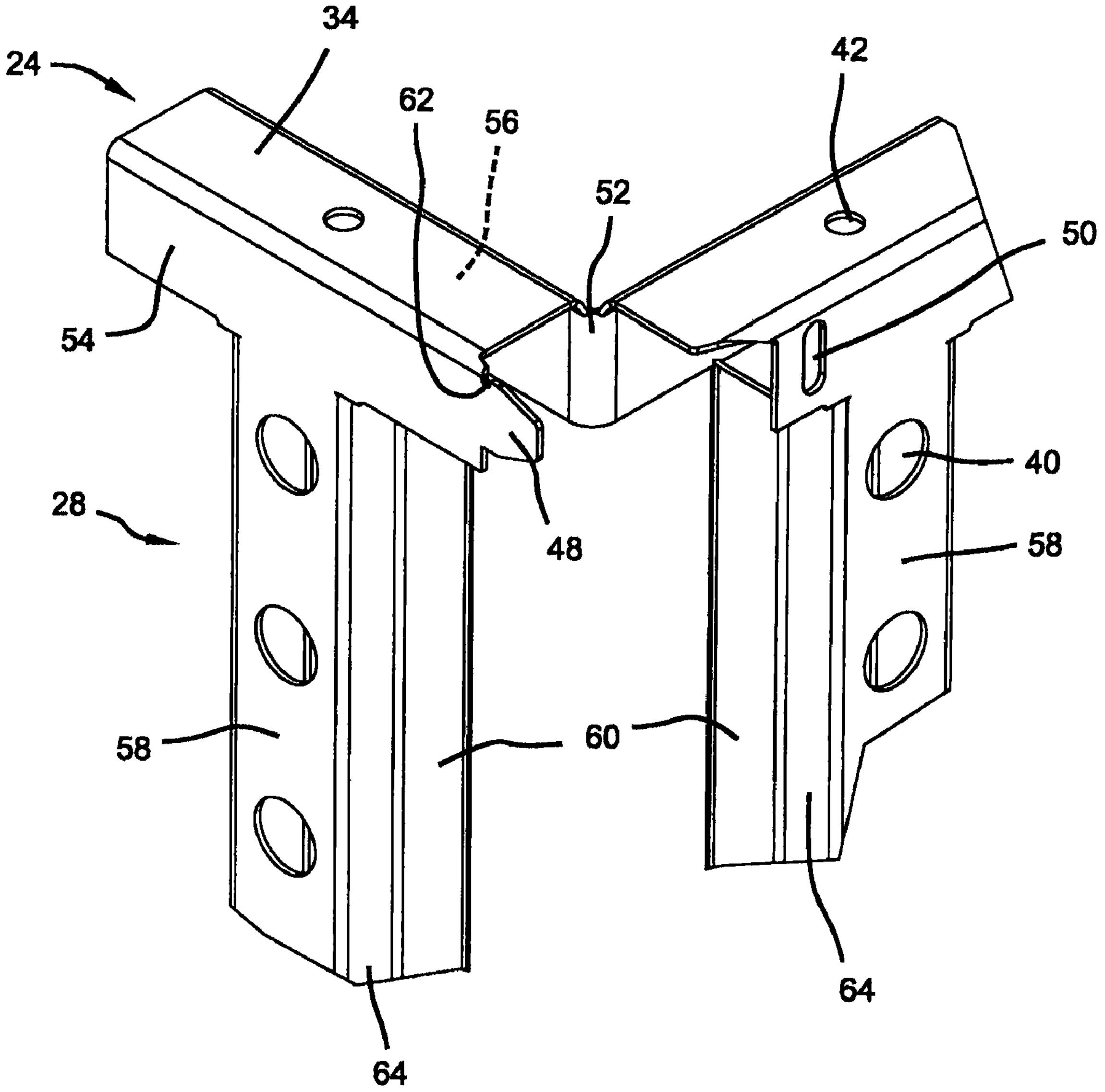
FIG. 7 is a perspective view illustrating the tab and slot features of a stabilizing portion extended in an outward position.

FIG. 6 is a perspective view illustrating the tab 48 and slot 50 system of a support member 22 prior to folding. FIG. 7 is a perspective view illustrating the tab 48 and slot 50 features after the stabilizing portion 36 is extended in an outward position. The tabs 48 appear when the stabilizing legs 36, or end portions, are folded out from an integral hinged area 52. In various embodiments, the upper and lower rails 24, 26 define a substantially U-shaped cross section. The rails 24, 26 preferably have a supporting surface 34 disposed between longitudinally extending front 54 and rear 56 edges. The columns 28 have a center portion 58 and two opposing inwardly folded side walls 60. The center portion 58 is integral with the front edge 54 of each rail 24, 26 and is preferably provided with a plurality of apertures configured to allow airflow there through. The side walls 60 extend from the front edge 54 of the rails 24, 26 to the rear edge 56 thereby supporting the entire width of the rails 24, 26. In preferred embodiments, the side walls 60 extend a distance beyond the rear rail edge 56 as will be discussed in more detail below.

Figure 8:
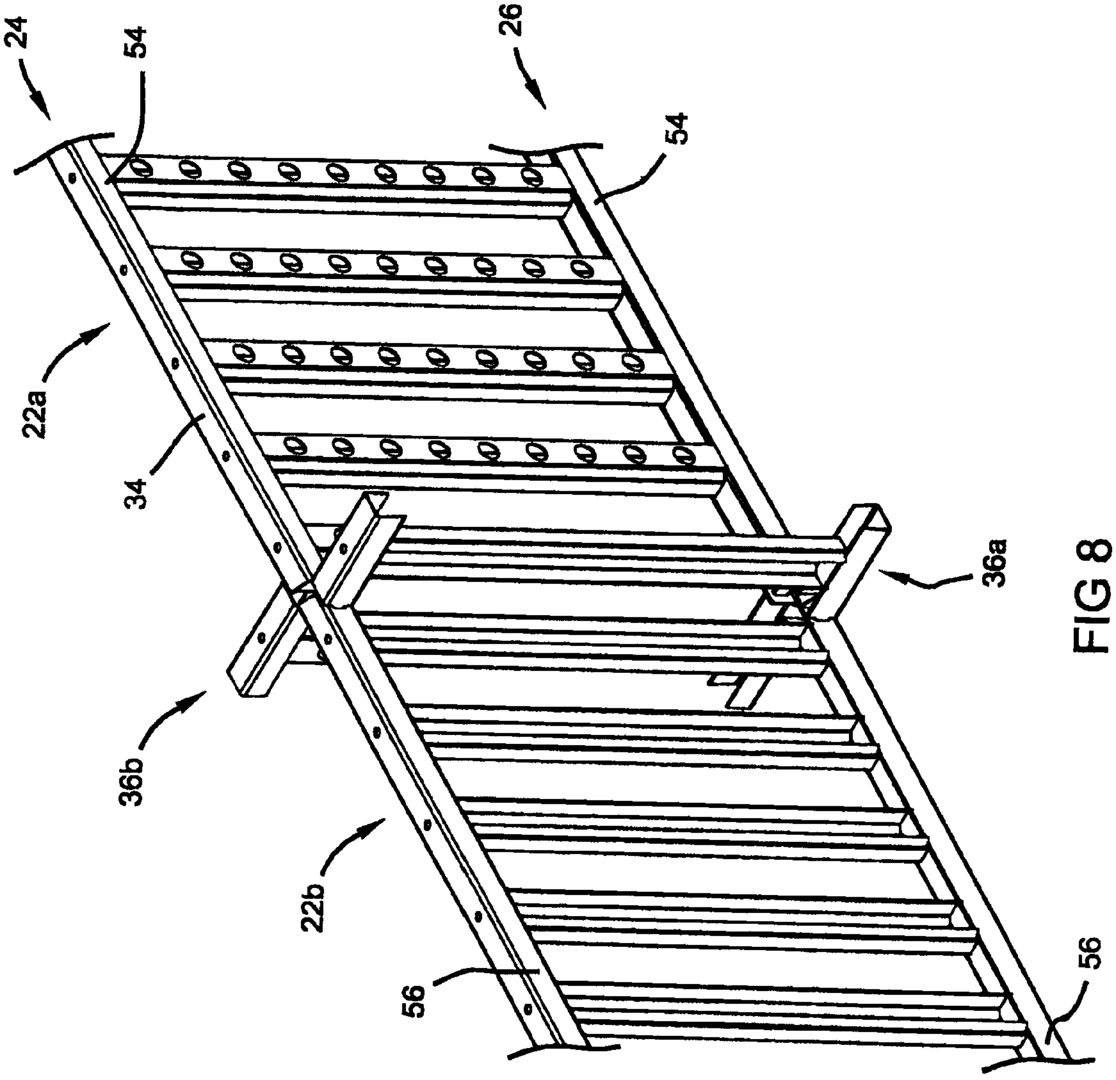
FIGS. 8 and 9 are perspective views illustrating the union of adjacent support members to one another.
Figure 9:
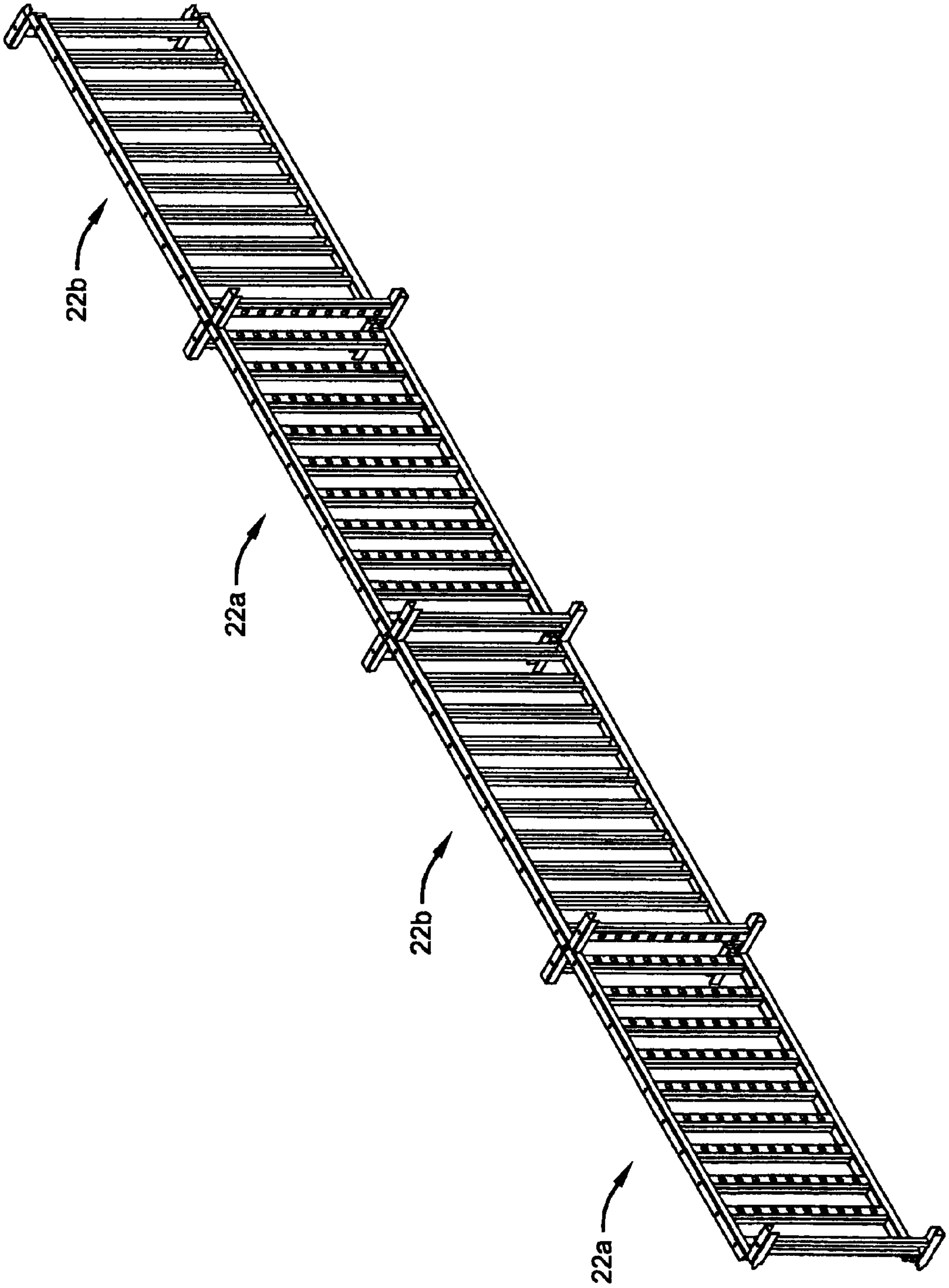

As illustrated in FIGS. 8 and 9, once the support members 22 are properly aligned, the upper and lower tabs 48 of a first stabilizing leg **36*a* of a first and front facing support member 22*a* are inserted into the respective upper and lower slots 50 of a second and rear facing adjacent support member 22*b*. In the same respect, the upper and lower tabs 48 of a second stabilizing leg 36*b* of the second and rear facing support member 22*b* are inserted into the respective upper and lower slots 50 of the first support member 22*a*, thus enabling the interlocking of the two support members 22*a*, 22*b* to one another. As shown in FIG. 9, in various embodiments the support members 22*a*, 22*b* are preferably aligned in an alternating front facing 22*a*-rear facing 22*b*** pattern.

With renewed reference to FIGS. 4 and 5, a small notch 62 is disposed in one corner edge region of each tab member 48 that is configured to lock the tab member 48 within a corresponding slot 50. During assembly, preferably the opposing tabs 48 of adjacent support members 22*a*, 22*b* are inserted into the respective slots 50 of adjacent support members 22*a*, 22*b* simultaneously. In this regard, opposing forces cause the notched tabs to "snap" into place, locking the adjacent support members 22*a*, 22*b* together, both at the upper and lower rails 24, 26. This method of attachment provides additional and continuous stability to the full length of interior support rows, and ensures a generally straight alignment of the members 22 in each row which assists and controls the installation spacing.

Figure 10:
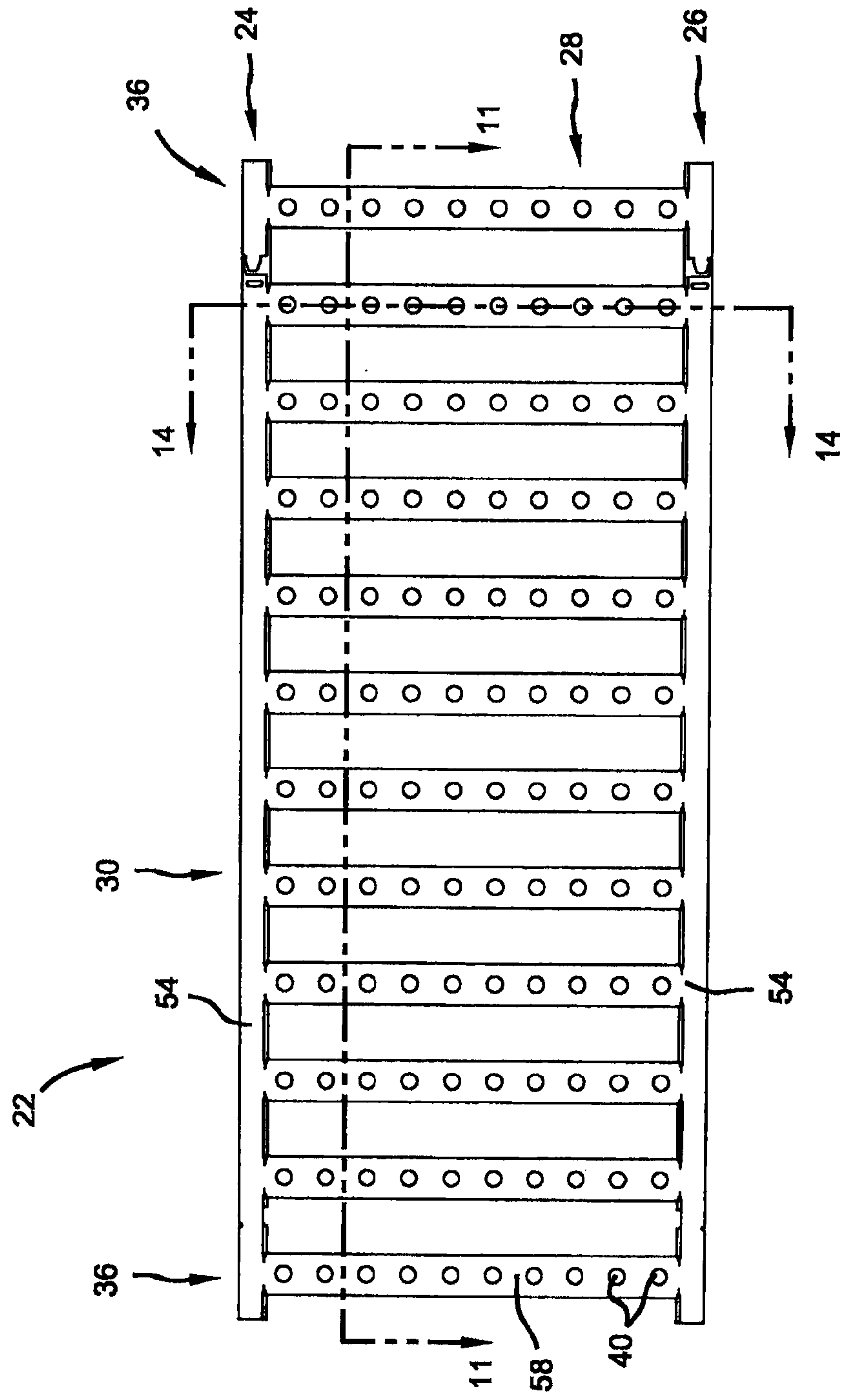
FIG. 10 is a front view of the support member in an unfolded planar state.
Figure 11:
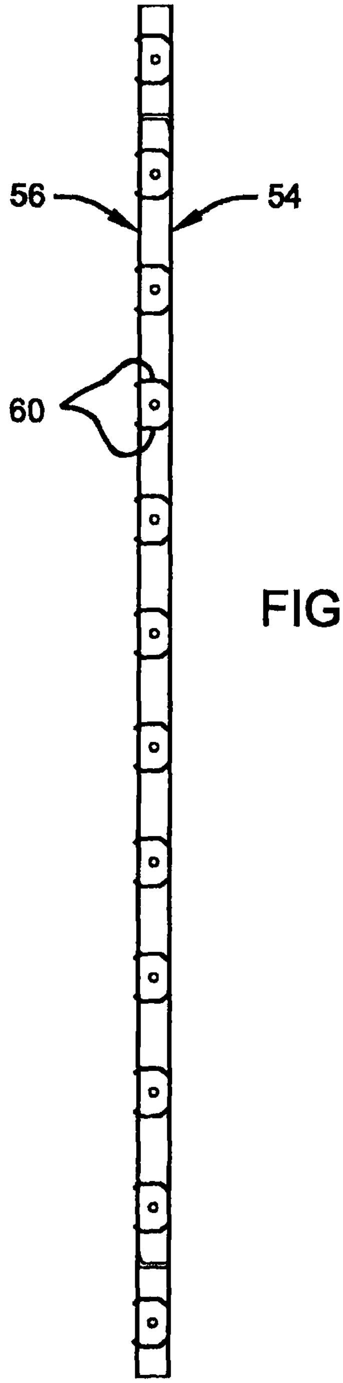
FIG. 11 is a cross-sectional plan view of FIG. 10 taken along the line 11-11.
Figure 12:
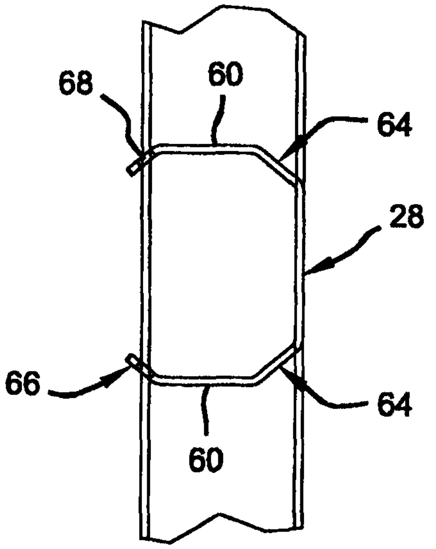
FIG. 12 is an exploded view of a column of FIG. 11.

FIG. 10 illustrates a front plan view of a support member 22 with its stabilizing legs 36 in an unfolded position. FIG. 11 is a cross-sectional plan view of the support member 22 of FIG. 10 taken along the line 11-11. A more detailed view, as depicted in FIG. 12, illustrates the columns 28 defining a substantially C-shaped cross-section. In preferred embodiments, corner segments 64 are disposed between the center portion 58 and both opposing side walls 60. Preferably, the corners 64 are shaped and formed at an angle of about 45° relative to the both the center portion 58 and the side walls 60. The angled corners 64 assist the direction the air flow around and between adjacent columns 28, providing a more aerodynamic path for air to flow around each column 28.

Figure 13:
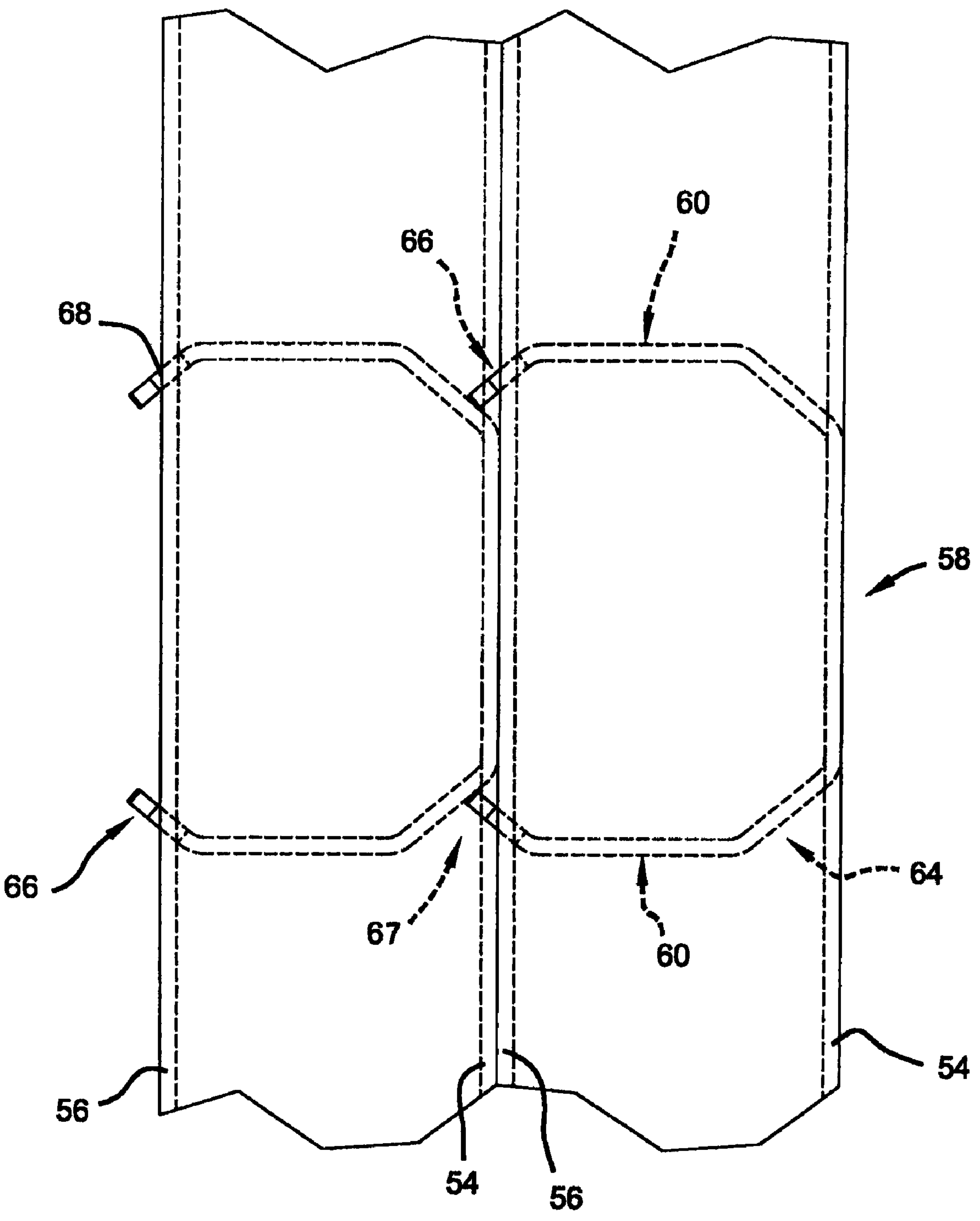
FIG. 13 illustrates one preferred stacking arrangement having the columns of adjacent support members coupled for shipment.
Figure 18:
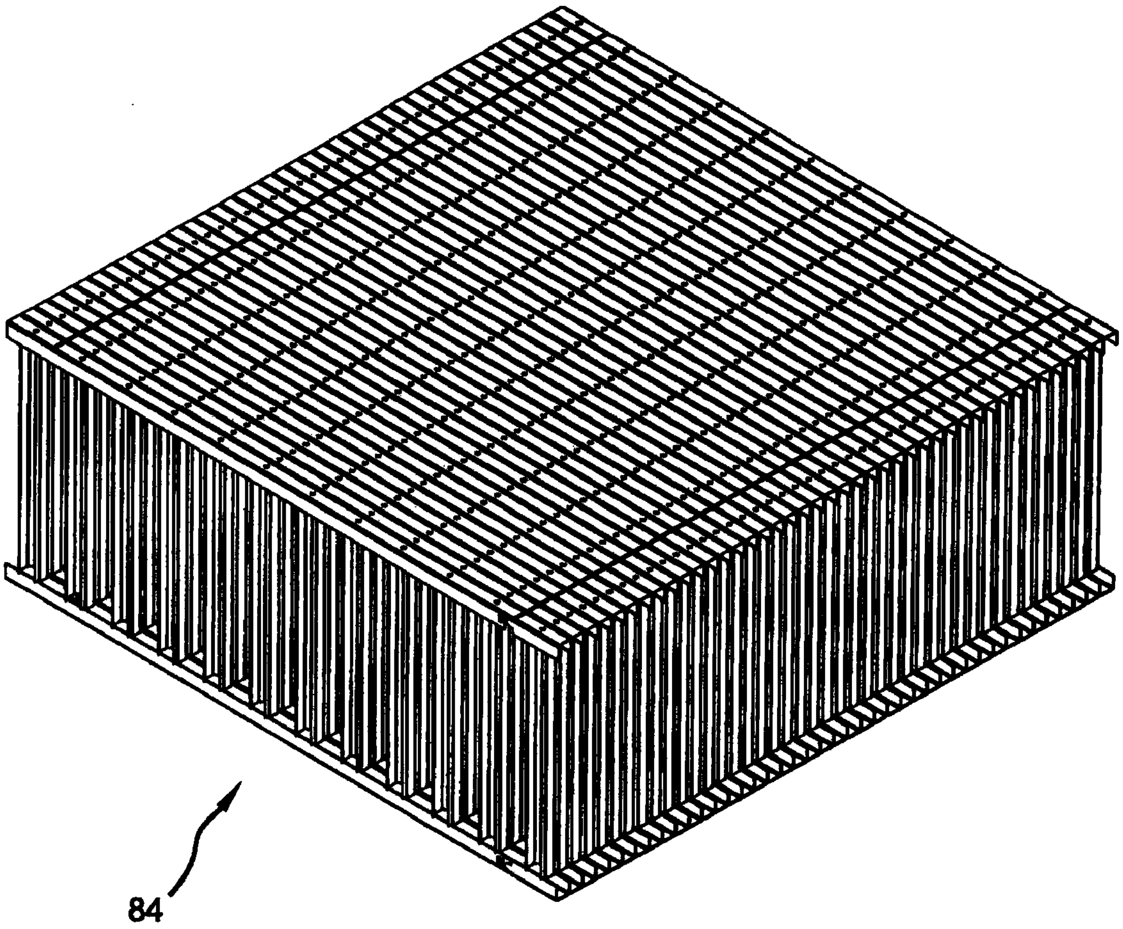
FIG. 18 illustrates a plurality of support members arranged for shipment.

FIG. 13 illustrates one preferred stacking arrangement having the columns 28 of adjacent support members 22 interlocked for shipment. In preferred embodiments, each side wall 60 has an integral extension member 66 that extends a distance beyond the rear edge 56 of the rails 24, 26. The extension member 66 is preferably angled relative to each side wall 60 and configured to engage a column 28 of an adjacent support member 22 when a plurality of support members 22 are stacked together for shipment. As depicted, preferably each corner segment 64 is formed at an angle such that the interlocking extension member 66 abuts and is substantially normal to a respective corner segment 64. This allows for the creation of another interlocking feature, or coupling area 67 when the support members 22 are aligned, stacked and bundled for shipping; creating a more stable package and minimizing the risk of support members 22 sliding out or racking sideways relative to one another during shipment. An exemplary arrangement 84 of the support members 22 for shipping in stacked bundles on a pallet or other suitable device is shown in FIG. 18.

Figure 15:
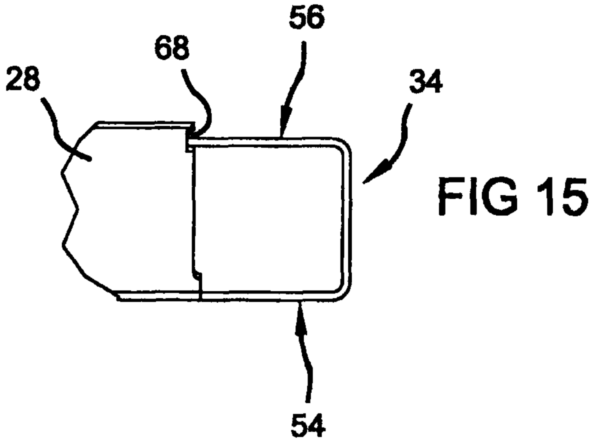
FIG. 15 is an exploded fragmented view of a lower rail region of FIG. 14.
Figure 14:
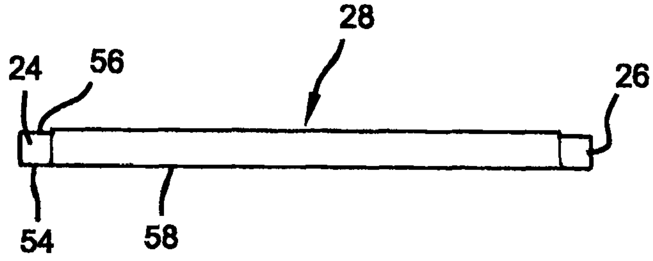
FIG. 14 is cross-sectional side view of FIG. 10 taken along the line 14-14.

FIG. 14 is cross-sectional side view of a column 28 of FIG. 10 taken along the line 14-14 and illustrates a side wall 60 extending a distance beyond the rear edge 56 of the rails 24, 26. FIG. 15 is an exploded view of the lower rail 26 region of FIG. 14. In one preferred embodiment, the side walls 60 of the columns 28 have a notch 68 or recessed area adjacent to the rear edge 56. This notched area 68 serves to align the side walls 60 of the columns 28 with the rails 24, 26 and to interlock the column 28 with the rear edge 56 of each rail 24, 26 to minimize any movement of the columns 28 and rails 24, 26 with respect to one another. In an alternate embodiment, the rear edge 56 portion of the rails 24, 26 define a plurality of notches 69 configured to interlock with the side walls 60. For illustrative purposes, FIG. 3 depicts two such notches 69 defined in a rear edge portion of the blank 38.

Figure 16:
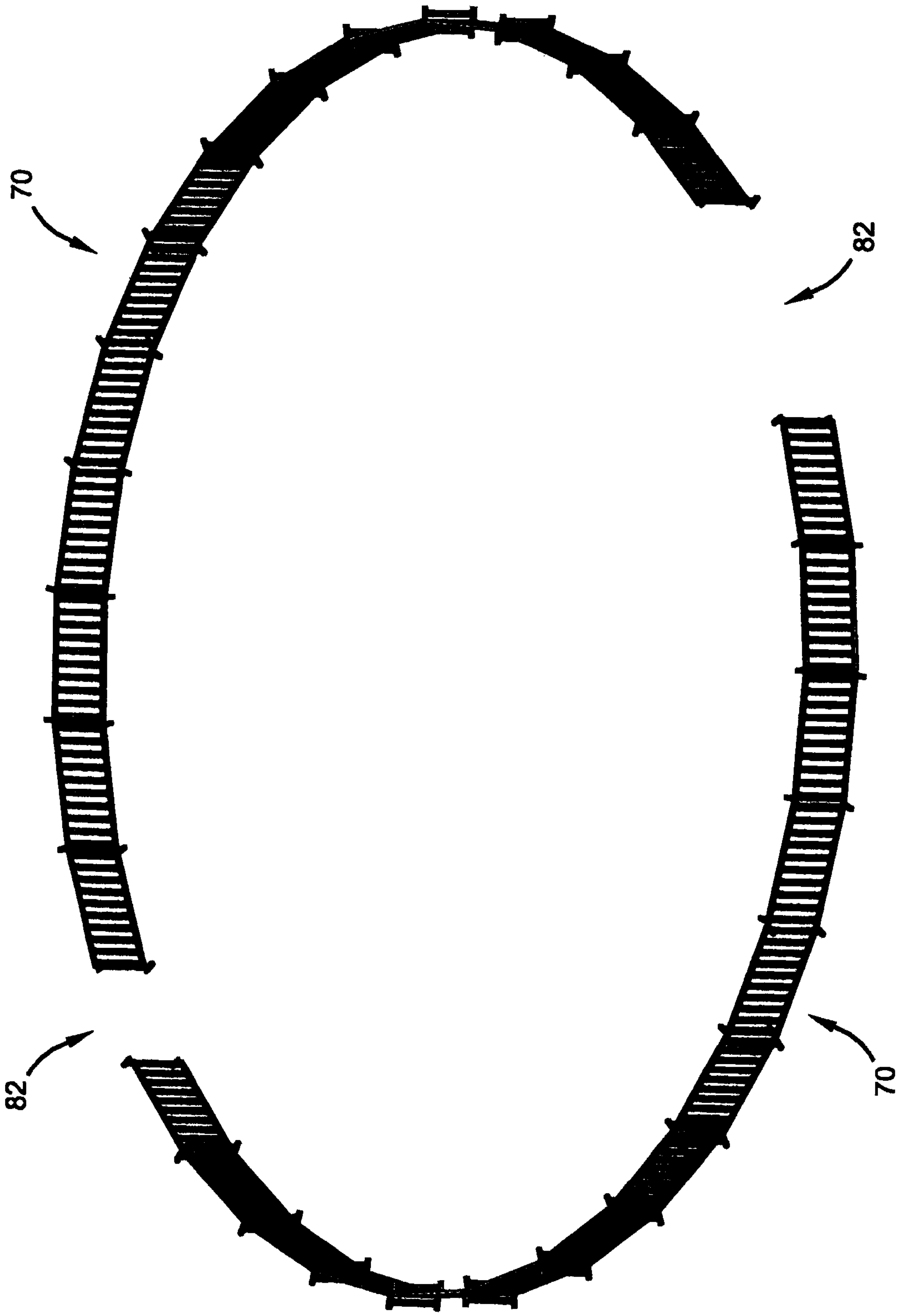
FIG. 16 is a perspective view illustrating a plurality of support members defining an outer perimeter of the support system according to the present invention.
Figure 17:
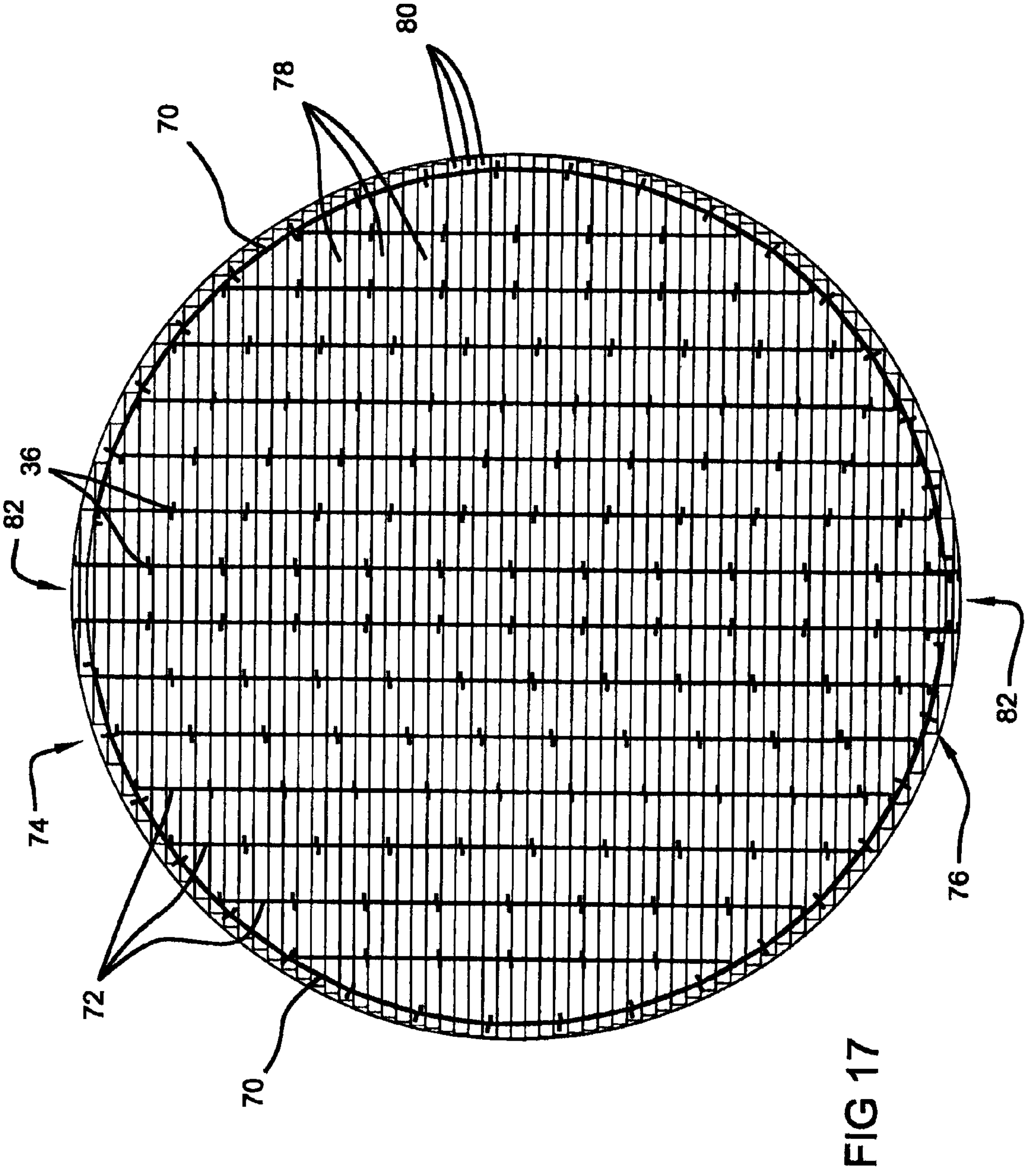
FIG. 17 is a schematic view illustrating the overall design of one embodiment of the floor support system having the support members arranged defining two semi-circular perimeter portions with a plurality of interior rows.

As shown in FIGS. 16 and 17, according to one aspect of the present invention, a first plurality of support members 22 are installed and interconnected defining a substantially curved, or circular, outer perimeter 70 that resembles and is disposed adjacent to the inner perimeter of a grain bin storage facility. A second plurality of interconnected support members 22 is arranged forming a series of interior rows 72, preferably extending across the outer perimeter. In various embodiments, the second plurality of support members 22 define a series of generally parallel rows 72 extending from a first position 74 of the perimeter 70 to a second and opposite position 76. Preferably, the interior rows 72 are arranged parallel to the direction of air flow.

The correct spanning of rows 72 and the number of floor planks 78 overlaid on each support member 22 is critical because of the significant grain loads the planks 78 are required to carry. In various embodiments, the floor support members 22 of the present invention are adapted to support at least five flooring planks 78. In various preferred embodiments, the grain bin floor panels 78 overlay the support members 22 in a substantially perpendicular manner. This design reduces the number of support members 22 that are required to support the floor planks 78 by about two-thirds as compared to the bent or curved style support members of the prior art. It also minimizes any placement issues normally incurred when using staggered patterns with many variations. This design additionally eliminates nearly one half of the chalk lines required to be placed on the concrete bin foundation and simplifies installation.

The tab 48 locking feature of the present invention makes the installation of the both the interior rows 72 and the outer perimeter 70 more intuitive and less confusing. The distance required between each support member is standardized and eliminates any guess work or estimations regarding spacing. It should be noted that in some instances, support members 22 may need to be secured to one another where it is not feasible to use the tab and slot interlocking mechanism. For example, it may be desired to secure the interior rows 72 to the outer perimeter 70, or provide additional securing reinforcement in areas near a blower. In these cases, mechanical fasteners such as U-shaped or U-base retaining clips, and similar fasteners as known by one skilled in the art, are used to secure and interlock adjacent members 22 to one another.

In one preferred embodiment, there is enough tolerance with the interlocking mechanism, and sufficient flex in each tab 48 and rail 24, 26 to allow the support members 22 to be repositioned at an angle between about 4° and about 25° related to each other. In one embodiment, the support members 22 are configured to be positioned at an angle up to about 17° in relation to one another after they have been assembled in a standard straight row. This allows for an assembled straight row to be fashioned into an arc shape perimeter 70, as shown in FIG. 16, to be placed around the perimeter of the grain bin, thus supporting the distal ends 80 of the floor planks 78. In an alternate embodiment, there is a second slot in each end 32 of the center segment 30 each rail 24, 26 (not shown). The additional slot would disposed on the rail 24, 26 to permit the support members 22 to be assembled in an arc initially, rather than in a straight row, by bending the legs at an increased angle and inserting the tab 48 into the second slot rather than the first slot.

As illustrated in FIGS. 16 and 17, it may be desirable to have one or more gaps 82, or discontinuities in the outer perimeter 70. This design provides areas to allow for the unloading of equipment and the placement of an aeration fan (not shown). FIG. 17 depicts a schematic of the overall design of the present invention, having two semi-circular perimeter portions 70 with a plurality of rows 72 extending in a substantially parallel manner from one end of the grain bin to an opposite end. In certain embodiments, the perimeter is continuous. As shown, the floor planks 78 are arranged perpendicular to the support members 22. In one embodiment, it is preferred that the support members 22 are aligned in rows parallel to the air flow. In addition, any gaps 82 are generally located in positions where the planks 78 are generally aligned parallel to the gaps 82 such that both of the distal ends 80 of the planks are sufficiently supported. In various embodiments, at least a portion of each interior row 72 is connected to the outer perimeter 70. In certain instances, supplemental clip members are used to join and secure the ends of each row 72 to the perimeter 70.

Figure 19:
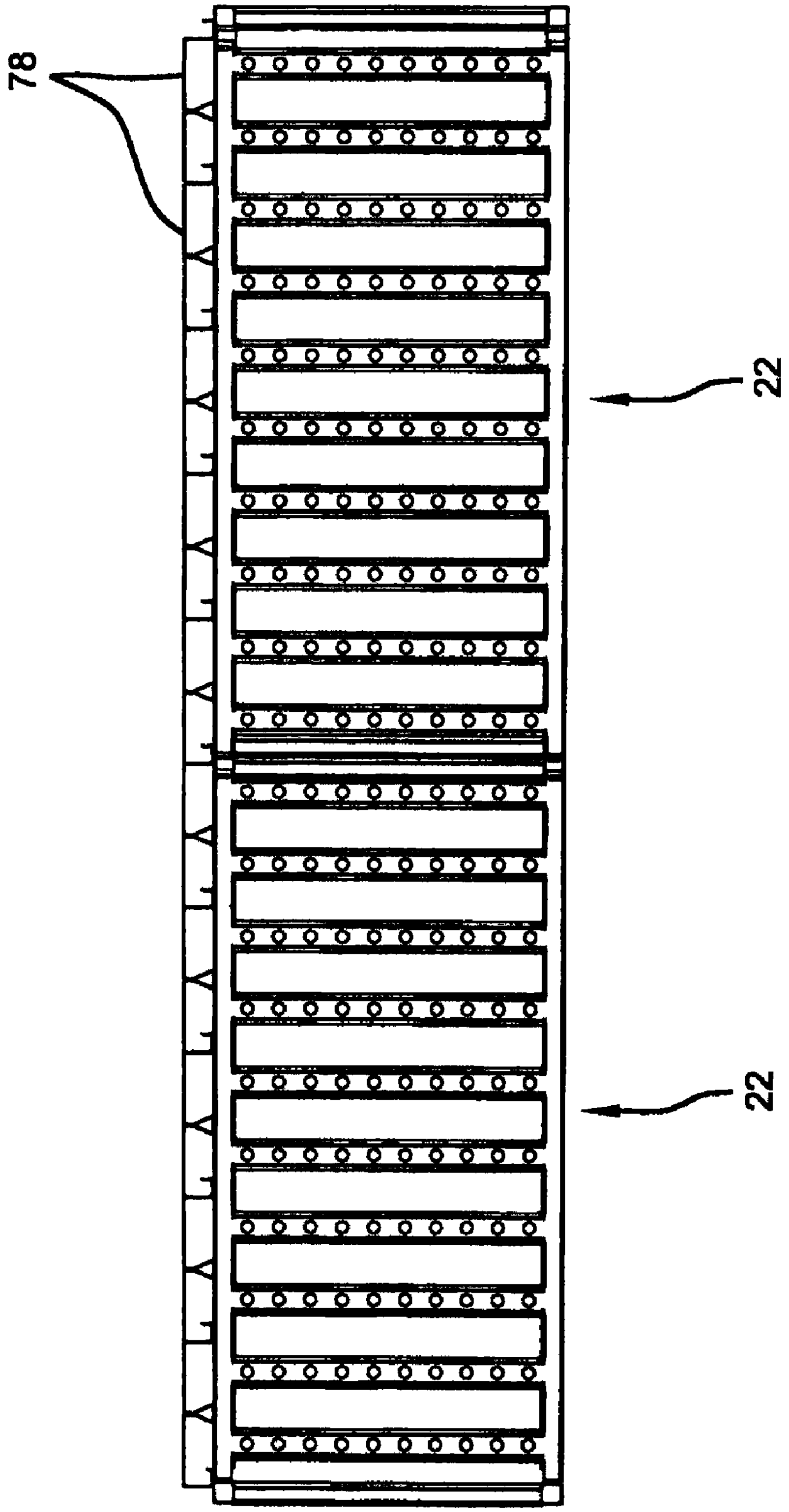
FIG. 19 is a partial plan view illustrating a plurality of floor planks resting on two support members.
Figure 20:
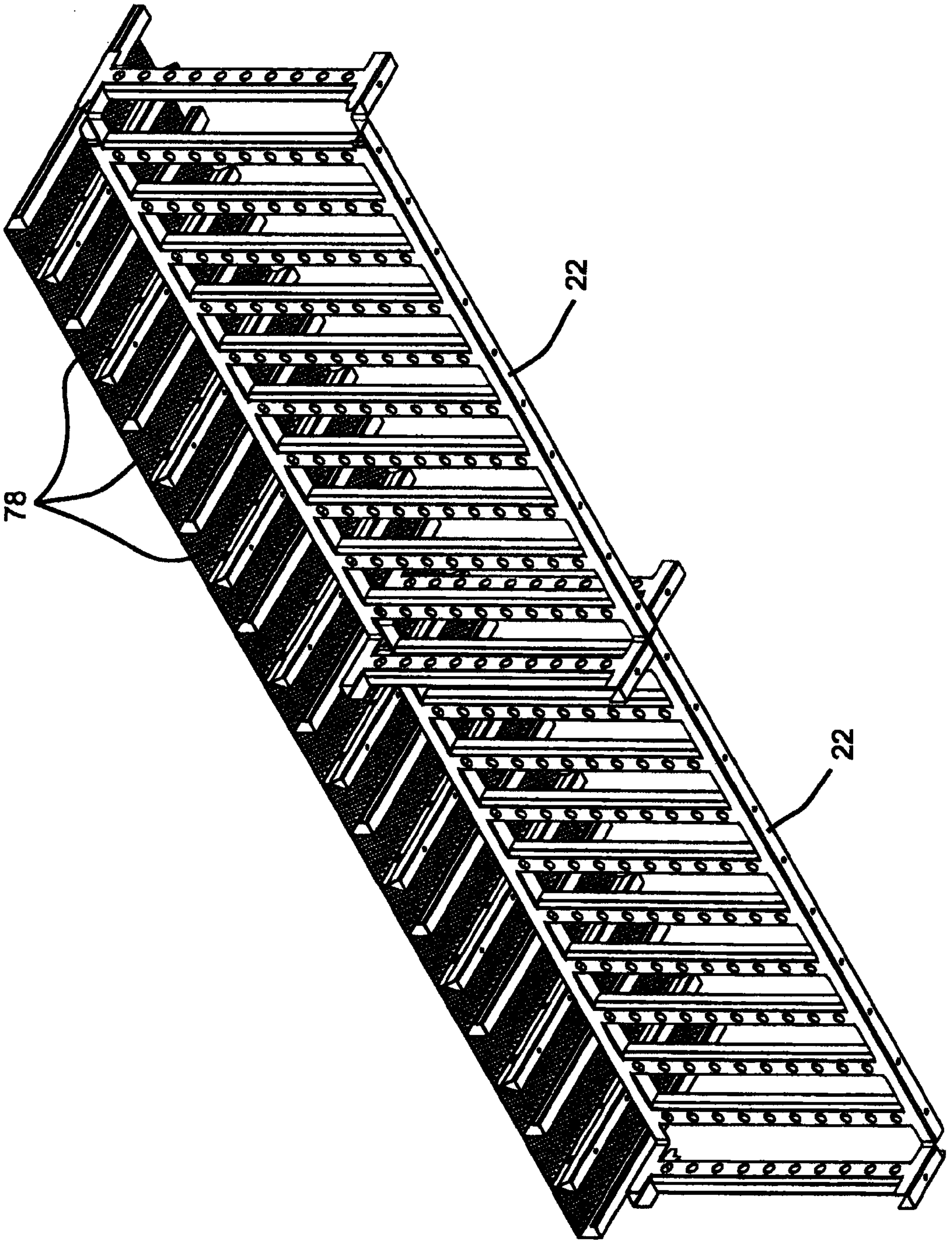
FIG. 20 is a perspective view of FIG. 19.

As previously discussed, at least a portion of the upper and lower rails provide a substantially horizontal support surface 34 to interface with the floor planks 78 or the bin foundation, respectively, if necessary to minimize or prevent movement due to the high pressure air flow in the immediate vicinity of the aeration fan. This can be accomplished by utilizing the rail apertures 42 and securing fastening members such as pop-rivets to the floor planks 78, and concrete nails or other suitable nails to the bin foundation. FIGS. 18 and 19 illustrate an exemplary side view and a perspective view, respectively, showing the floor planks 78 resting on the support members 22.

It is contemplated that the floor support members of the present invention can be manufactured in at least four different styles. In order to accommodate different sizes of unloading equipment and aeration fans, the support members 22 are preferably designed at heights of about twelve inches and about seventeen inches, although it should be understood that all suitable heights and widths are within the scope of the present invention. Additionally, the pluralities of floor support members 22 will be provided with at least two different lengths. This gives more flexibility in completing the various row and arc lengths required inside various grain bins. The different support member 22 lengths can be made to accommodate between two to about five or more planks 78 as desired. Preferably, the support members 22 have between three and twelve support columns 28, although any suitable number may be used.

In one embodiment, the preferred dimensions of the support members 22 are at least about one inch wide by about forty-two inches long, and may be customized as desired. The support members 22 preferably provide at least one inch wide rails 24, 26, with supporting surfaces 34 for the floor planks 78 to rest upon. This is important for the maximum load transfer from the floor planks 78 to the support members 22.

Focus is now directed to the method of constructing a support member of the present invention. According to one presently preferred method, a monolithic flat sheet of structural steel is provided and stamped with a pattern of channels 44 and apertures 40, 42 forming a blank 38. The blank 38 subsequently goes through a series of forming steps. In one embodiment, the upper and lower rails 24, 26 are partially shaped into a U-shape configuration. The vertical columns 28 are then formed into their corresponding C-shape having approximately 45 degree angle bends. The upper and lower rails 24, 26 are then re-shaped and aligned with the columns 28, securing the rear edge portion 56 of the rail 24, 26 within the notches 68 disposed in the side walls 60 of the columns 28, as previously described. Once a plurality of members 22 are shaped and formed into their substantially flat shipping configuration, as shown in FIGS. 1 and 10, they are aligned, stacked and/or bundled for shipment as shown in FIG. 18. FIG. 13 illustrates the manner in which the columns 28 of one support member 22 interlock the columns 28 of an adjacent support member 28 in the stack 84. The stack 84 is then shipped to its destination.

At the destination, the support members 22 are removed from the stack 84 and at least one of the stabilizing legs 36 is manually bent, or folded from an in-plane to an out-of-plane arrangement with minimal need for any tools. Preferably, two legs 36 are folded in opposite outward directions. The support members 22 are positioned on the grain bin foundation as desired with the tabs 48 and slots 50 of adjacent support members 22 respectively aligned with one another. Once the support members 22 are properly positioned, the tabs 48 of one support member 22*a* are inserted into the corresponding slots of an adjacent support member 22*b* and are interlocked together. The interlocking requires minimal use of tools, and no welding is required remove in the construction. Outer perimeter regions 70 are angled and positioned near the grain bin perimeter with appropriate gaps 82 or discontinuities as desired, and interior rows 72 are secured to the perimeter 70 where required. Certain support members 22 may be secured to the bin foundation as necessary. A plurality of floor planks 78 are then attached to the support members 22 thereby forming a false floor.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of constructing a grain bin floor system, the method comprising:

providing a unitary flat sheet of structural steel;

stamping a pattern of channels and apertures in said flat sheet to form a blank;

shaping and forming said blank into a support member having first and second spaced apart rails spanning across and integrally connected by a plurality of transverse support columns, wherein said support member comprises at least one stabilizing portion;

outwardly extending said stabilizing portion of said support member into a substantially non-planar Z-shaped configuration.

2. The method according to claim 1, further comprising:

arranging said support members on a grain bin foundation;

interconnecting adjacent support members using a tab and slot system; and with said first and second rails in a horizontal orientation, securing a plurality of floor planks to said support members.

3. The method according to claim 1, further comprising:

aligning, stacking, and interlocking a plurality of said support members adjacent one another for shipment.

4. The method according to claim 1, further comprising providing each of said support member with an interlocking mechanism.

5. The method according to claim 1, further comprising scoring bend lines on said blank prior to said shaping and forming.

6. A method of constructing a grain bin floor system, the method comprising:

providing a unitary flat sheet of structural steel;

stamping a pattern of channels and apertures in said flat sheet to form a blank;

shaping and forming said blank into a support member having first and second spaced apart rails spanning across and integrally connected by a plurality of transverse support columns, wherein said support member comprises at least two stabilizing portions;

outwardly extending said at least two stabilizing portions of said support member into a substantially non-planar Z-shaped configuration providing free standing support;

arranging said support members on a grain bin foundation;

interconnecting adjacent support members using a tab and slot system; and with said first and second rails in a horizontal orientation, securing a plurality of floor planks to said support members.

7. The method according to claim 6, further comprising providing each said support member with an interlocking mechanism.

8. The method according to claim 6, further comprising scoring bend lines on said blank prior to said shaping and forming.

* * * * *